(12) United States Patent
Durdevic et al.

(10) Patent No.: US 10,850,803 B2
(45) Date of Patent: Dec. 1, 2020

(54) ELECTRIC BICYCLE

(71) Applicant: BIKETEC AG, Huttwil (CH)

(72) Inventors: Ivica Durdevic, Huttwil (CH); Lukas Beat Studer, Neuendorf (CH); Philipp Walter Suter, Emmen (CH); Simon Lanz, Gondiswil (CH); Robin Woodtli, Solothurn (CH); Timo Woelk, Fischbachau (DE); Omar Afzal, Munich (DE)

(73) Assignee: BIKETEC AG, Huttwil (CH)

( * ) Notice: Subject to any disclaimer, the term of this patent is extended or adjusted under 35 U.S.C. 154(b) by 8 days.

(21) Appl. No.: 15/905,124

(22) Filed: Feb. 26, 2018

(65) Prior Publication Data

US 2018/0251188 A1    Sep. 6, 2018

Related U.S. Application Data

(63) Continuation of application No. PCT/EP2016/070081, filed on Aug. 25, 2016.

(30) Foreign Application Priority Data

Aug. 25, 2015 (DE) .......... 10 2015 216 178
Aug. 25, 2015 (DE) .......... 10 2015 216 186
Aug. 25, 2015 (DE) .......... 10 2015 216 188

(51) Int. Cl.
*B62M 6/55* (2010.01)
*B62M 6/50* (2010.01)
(Continued)

(52) U.S. Cl.
CPC .............. *B62M 6/55* (2013.01); *B60K 35/00* (2013.01); *B62J 99/00* (2013.01); *B62K 19/30* (2013.01);
(Continued)

(58) Field of Classification Search
CPC .......... B62M 6/55; B62M 6/50; B62M 25/08; B62M 2025/003; B60K 35/00;
(Continued)

(56) References Cited

U.S. PATENT DOCUMENTS

| | | |
|---|---|---|
| 5,789,702 A | 8/1998 | Perella |
| 6,204,752 B1 | 3/2001 | Kishimoto |

(Continued)

FOREIGN PATENT DOCUMENTS

| | | |
|---|---|---|
| CN | 1343598 A | 4/2002 |
| CN | 1443686 A | 9/2003 |

(Continued)

OTHER PUBLICATIONS

German Office Action for Application No. 10 2015 216 178.1 dated May 17, 2016.
(Continued)

*Primary Examiner* — Ruth Ilan
*Assistant Examiner* — Marlon A Arce
(74) *Attorney, Agent, or Firm* — Jenkins, Wilson, Taylor & Hunt, P.A.

(57) ABSTRACT

An electric bicycle having a control unit, a drive unit, a battery unit, a display unit and a remote control unit for display unit, remote control unit being situated in the region of a handlebar grip remote from display unit. According to the present disclosure, electronic control unit is situated in seat tube of bicycle frame.

9 Claims, 5 Drawing Sheets

(51) Int. Cl.

| | | |
|---|---|---|
| *B62K 23/06* | (2006.01) | |
| *B62K 19/30* | (2006.01) | |
| *B62K 23/02* | (2006.01) | |
| *B62M 6/45* | (2010.01) | |
| *B62K 19/40* | (2006.01) | |
| *B60K 35/00* | (2006.01) | |
| *B62J 99/00* | (2020.01) | |
| *B62M 25/08* | (2006.01) | |
| *G06F 3/02* | (2006.01) | |
| *B62J 50/21* | (2020.01) | |
| *B62M 25/00* | (2006.01) | |
| *B62K 21/12* | (2006.01) | |

(52) U.S. Cl.
CPC ............ *B62K 19/40* (2013.01); *B62K 23/02* (2013.01); *B62K 23/06* (2013.01); *B62M 6/45* (2013.01); *B62M 6/50* (2013.01); *B62M 25/08* (2013.01); *G06F 3/02* (2013.01); *B62J 50/225* (2020.02); *B62K 21/12* (2013.01); *B62K 2204/00* (2013.01); *B62M 2025/003* (2013.01)

(58) Field of Classification Search
CPC ... B62J 99/00; B62J 2099/0033; B62K 19/40; B62K 23/06; B62K 21/12; B62K 2204/00; B06F 3/02
See application file for complete search history.

(56) References Cited

U.S. PATENT DOCUMENTS

| | | | |
|---|---|---|---|
| 6,400,564 B1 | 6/2002 | Nishimoto et al. | |
| 6,401,997 B1 | 6/2002 | Smerdon, Jr. | |
| 6,584,872 B1 | 7/2003 | Kojima | |
| 6,682,087 B1* | 1/2004 | Takeda | B62J 99/00 280/238 |
| 7,976,048 B2 | 7/2011 | Bartolome Garcia et al. | |
| 8,469,381 B2* | 6/2013 | Dodman | B62M 6/55 280/281.1 |
| 8,525,793 B2 | 9/2013 | Sentchenkoff et al. | |
| 8,857,550 B2 | 10/2014 | Kim et al. | |
| 8,979,111 B2* | 3/2015 | Dal Pozzo | B62J 11/00 280/288.4 |
| 9,150,272 B1* | 10/2015 | Thompson | B62K 15/008 |
| 9,287,063 B2 | 3/2016 | Mueller et al. | |
| 9,483,133 B2 | 11/2016 | Gondo | |
| 10,647,381 B2 | 5/2020 | Durdevic et al. | |
| 10,703,436 B2 | 7/2020 | Durdevic et al. | |
| 2001/0039850 A1 | 11/2001 | Masui et al. | |
| 2001/0040204 A1 | 11/2001 | Irie | |
| 2002/0079211 A1 | 6/2002 | Katayama et al. | |
| 2004/0039522 A1 | 2/2004 | Jwo | |
| 2004/0239489 A1 | 12/2004 | Takeda | |
| 2005/0204854 A1 | 9/2005 | McLaughlin et al. | |
| 2005/0280244 A1* | 12/2005 | Watarai | B62J 11/00 280/288.4 |
| 2006/0186631 A1* | 8/2006 | Ishikawa | B62M 25/08 280/260 |
| 2008/0180233 A1 | 7/2008 | Miglioranza | |
| 2008/0298613 A1 | 12/2008 | Slamka et al. | |
| 2008/0312799 A1* | 12/2008 | Miglioranza | B62M 9/122 701/66 |
| 2009/0002198 A1 | 1/2009 | Bach | |
| 2009/0107825 A1 | 4/2009 | Chou et al. | |
| 2009/0170660 A1* | 7/2009 | Miglioranza | A63B 24/00 482/1 |
| 2010/0237120 A1* | 9/2010 | Muhlberger | B62J 11/00 224/562 |
| 2011/0267178 A1* | 11/2011 | Nishihara | B62K 23/02 340/12.39 |
| 2012/0049483 A1 | 3/2012 | Dodman et al. | |
| 2012/0159328 A1 | 6/2012 | Millington et al. | |
| 2012/0221205 A1 | 8/2012 | Ichida et al. | |
| 2012/0228107 A1 | 9/2012 | Funakoshi et al. | |
| 2012/0316710 A1 | 12/2012 | Saida | |
| 2013/0054068 A1 | 2/2013 | Shoge | |
| 2013/0228424 A1 | 9/2013 | Beck | |
| 2013/0257609 A1 | 10/2013 | Otsuji et al. | |
| 2013/0334874 A1 | 12/2013 | Shirai | |
| 2014/0080661 A1 | 3/2014 | Paick et al. | |
| 2014/0216198 A1* | 8/2014 | Kariyama | F16C 1/226 74/502.6 |
| 2014/0252746 A1 | 9/2014 | Talavasek et al. | |
| 2014/0353134 A1 | 12/2014 | Müller | |
| 2015/0100204 A1 | 4/2015 | Gondo | |
| 2015/0130944 A1 | 5/2015 | Hsu | |
| 2015/0151672 A1 | 6/2015 | Hsu | |
| 2016/0089072 A1 | 3/2016 | Tetsuka | |
| 2016/0144918 A1 | 5/2016 | Lee | |
| 2017/0073040 A1* | 3/2017 | Djakovic | B62M 6/45 |
| 2017/0320533 A1 | 11/2017 | Hayashi | |
| 2018/0251180 A1 | 9/2018 | Durdevic et al. | |
| 2018/0251184 A1 | 9/2018 | Durdevic et al. | |
| 2018/0362106 A1* | 12/2018 | Miles | B62J 1/08 |

FOREIGN PATENT DOCUMENTS

| | | |
|---|---|---|
| CN | 201287793 Y | 8/2009 |
| CN | 102233932 A | 11/2011 |
| CN | 202320636 U | 7/2012 |
| CN | 202429321 | 9/2012 |
| CN | 102741116 A | 10/2012 |
| CN | 202716986 U | 2/2013 |
| CN | 202911871 U | 5/2013 |
| CN | 103661769 A | 3/2014 |
| CN | 203958429 U | 11/2014 |
| CN | 204077923 U | 1/2015 |
| CN | 104516642 A | 4/2015 |
| DE | 29922486 U1 | 5/2000 |
| DE | 10 2006 032016 A1 | 1/2008 |
| DE | 10 2007 040738 A1 | 3/2009 |
| DE | 10 2010 039860 A1 | 3/2012 |
| DE | 20 2012 104592 U1 | 2/2013 |
| DE | 10 2012 200597 A1 | 7/2013 |
| DE | 20 2012 007991 U1 | 12/2013 |
| DE | 20 2013 002491 U1 | 6/2014 |
| DE | 20 2007 019569 U1 | 4/2015 |
| EP | 1342654 A2 | 9/2003 |
| EP | 1384659 B1 | 12/2009 |
| EP | 2581296 A1 | 4/2013 |
| EP | 2868563 A1 | 5/2015 |
| EP | 2868564 A1 | 5/2015 |
| JP | 2004 058993 A | 2/2004 |
| JP | 2006 001438 A | 1/2006 |
| JP | 3194818 U | 12/2014 |
| JP | 2015 044463 A | 3/2015 |
| KR | 2011 0114962 A | 10/2011 |
| KR | 2013 0013115 A | 2/2013 |
| TW | 201524838 A | 7/2015 |
| WO | WO 2011/081359 A2 | 7/2011 |
| WO | WO 2017/032833 A1 | 3/2017 |
| WO | WO 2017/032836 A1 | 3/2017 |

OTHER PUBLICATIONS

German Office Action for Application No. 10 2015 216 186.2 dated May 19, 2016.

German Office Action for Application No. 10 2015 216 188.9 dated May 24, 2016.

English International Preliminary Examination Report and Written Opinion for Application No. PCT/EP2016/070081 dated Feb. 27, 2018.

English International Preliminary Examination Report and Written Opinion for Application No. PCT/EP2016/070082 dated Feb. 27, 2018.

English International Preliminary Examination Report and Written Opinion for Application No. PCT/EP2016/070085 dated Feb. 27, 2018.

Non-Final Office Action for U.S. Appl. No. 15/905,191 dated Sep. 17, 2018.

(56) References Cited

OTHER PUBLICATIONS

Non-Final Office Action for U.S. Appl. No. 15/905,142 dated Sep. 15, 2018.
Interational Search Report with German Written Opinion for Application No. PCT/EP2016/070081 dated Nov. 18, 2016.
International Search Report with German Opinion for Application No. PCT/EP2016/070082 dated Nov. 18, 2016.
International Search Report with German Written Opinion for Application No. PCT/EP2016/070085 dated Nov. 18, 2016.
Final Office Action for U.S. Appl. No. 15/905,142 dated Feb. 5, 2019.
Final Office Action for U.S. Appl. No. 15/905,191 dated Feb. 7, 2019.
Chinese Office Action for Application No. 201680061756.4 dated Jul. 2, 2019.
Chinese Office Action for Application No. 201680061787 dated Jul. 3, 2019.
Chinese Office Action for Application No. 201680061688.1 dated Jul. 10, 2019.
Notice of Allowance and Interview Summary for U.S. Appl. No. 15/905,191 dated Oct. 30, 2019.
European Office Action for Application No. 16757869.9 dated Oct. 30, 2019.
European Office Action for Application No. 16759723.6 dated Oct. 30, 2019.
Japanese Office Action for Application No. 2018-510879 dated Jul. 2, 2020.
Japanese Office Action for Application No. 2018-510874 dated Jul. 3, 2020.
Notice of Allowance for U.S. Appl. No. 15/905,142 dated Jan. 10, 2020.
Chinese Office Action for Application No. 201680061787 dated Mar. 5, 2020.
Notice of Allowance for U.S. Appl. No. 15/905,191 dated Mar. 11, 2020.
Chinese Office Action for Application No. 201680061688.1 dated Mar. 30, 2020.
Non-Final Office Action for U.S. Appl. No. 15/905,142 dated Jun. 12, 2019.
Non-Final Office Action for U.S. Appl. No. 15/905,191 dated Jun. 19, 2019.
Japenese Office Action for Application No. 2018-510872 dated Sep. 9, 2020.

* cited by examiner

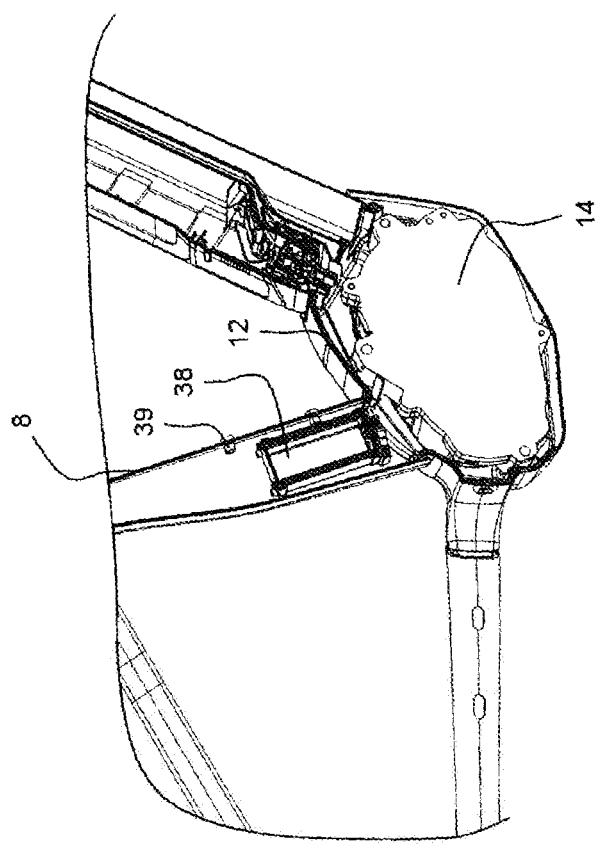

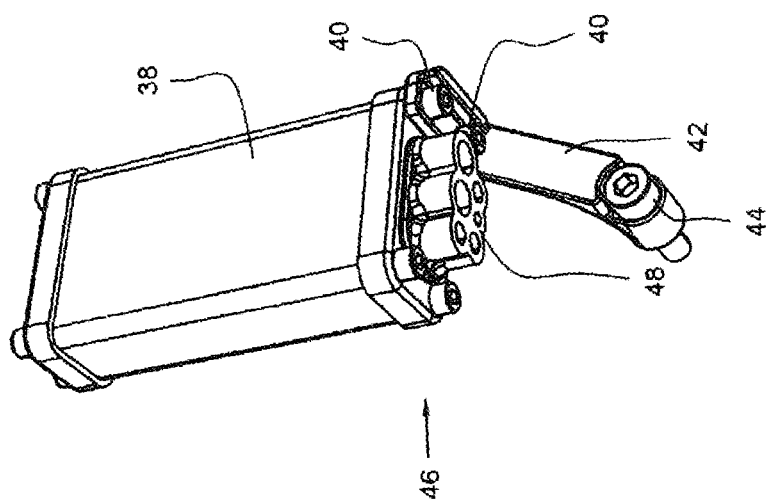

ELECTRIC BICYCLE

CROSS-REFERENCE TO RELATED APPLICATIONS

This application is a continuation of and claims priority to PCT/EP2016/070081 filed Aug. 25, 2016, which claims the benefit of and priority to German Patent Application Nos. DE 10 2015 216 178.1, DE 10 2015 216 186.2 and DE 10 2015 216 188.9, each filed Aug. 25, 2015, the entire disclosures of which are incorporated by reference herein.

TECHNICAL FIELD

The present disclosure relates to an electric bicycle.

BACKGROUND

Electric bicycles, such as pedelecs or e-bikes, enjoy great popularity as an easy-to-use, emission-free means of transportation. Particularly suitable types of bicycles are available for different fields of application. These include, inter alia, bicycles optimized for leisure time use or for the way to work, on the road or in light terrain (for example, city bikes or touring bikes,) and e-mountain bikes (E-MTB), which have been developed in various designs for off-road use and especially for mountainous terrain. Electric bicycles offer the possibility to increase the operating radius without overstraining the rider and to increase the average driving speed.

Electric bicycles are known from the prior art, which in addition to a drive unit, a battery unit, a display unit and a remote control unit for the display unit, have, in particular, an electronic control unit (ECU) for function control. In this instance, the electronic control unit is assigned to the battery unit situated in the region of the down tube. A disadvantage of such an ECU arrangement is that less space for the battery cells and thus a reduced operating distance is available. Furthermore, this arrangement can lead to thermal problems, since, in particular, the battery cells, but also the electronic components of the control unit, dissipate heat. Furthermore, special battery housings having a mounting option for the control unit are required. Overall, such battery packs therefore require a relatively large amount of space and, hence, can downgrade the comfort.

SUMMARY

For this reason, an object of the present disclosure is to provide a novel bicycle concept, which aligns electrically assisted mobility with the demands of athletic and lifestyle-oriented cyclists.

This object is achieved by an electric bicycle having features as disclosed herein.

An electric bicycle according to the present disclosure has an electronic control unit, a drive unit, a battery unit, a display unit and a remote control unit for the display unit, the remote control unit being situated in the region of a handlebar grip remote from the display unit. According to the present disclosure, the electronic control unit is situated in the seat tube of the bicycle frame. As a result, a highly integrated interaction between the frame and the installation elements is achieved. The design of the battery unit preferably situated in the down tube of the bicycle frame is not limited and more space for the battery cells and thus a high operating distance is available. Because of the thermal decoupling of battery unit and electronic control unit, a high efficiency is achieved. Special battery housings having fastening options for the control unit are not required. Overall, a compact, homogeneous frame shape of highest strength is achieved in this variant. The concept according to the present disclosure therefore also meets the demands of a lifestyle-conscious, ambitiously sportive rider.

It has been proven to be particularly advantageous if the electronic control unit is situated in the lower region of the seat tube adjacent to the drive unit. As a result, the electrical line length is reduced to a minimum. The electric bicycle has an optimized frame cross-section having constructively and aesthetically best features for optimized space requirements.

In a preferred exemplary embodiment, the electronic control unit is attached to the frame-side drive carrier (motor bracket) of the drive unit. As a result, no further frame-side fastening elements are needed. A weight reduction can be achieved.

The electronic control unit is preferably provided with line connections only at an end section facing the drive unit, so that the construction is simplified and the line lengths are minimal. All lines are preferably guided out at the bottom of the frame.

According to a particularly preferred embodiment of the present disclosure, at least one stop, in particular a fastening element of the bottle holder, for example a bottle holder bush, for the seat post is situated above the electronic control unit. As a result, damage to the electronic control unit by a long seat post is prevented.

Preferably, at least one line of the remote control unit is connected to the display unit and at least one electrical line of the display unit is connected to the electronic control unit. It has proven to be particularly advantageous if only one bus line is provided between the remote control unit and the display unit. Furthermore, it is particularly advantageous if only one bus line is provided between the display unit and the electronic control unit. The number of cables to be laid, and thus weight and assembly costs, are therefore minimized.

It is particularly advantageous if the brake signal lines are connected directly to the display unit and not directly to the ECU. As a result, only one electrical line between the electronic control unit and the display unit is required. The number of lines is reduced. When the brake is applied, the brake light is activated.

Accordingly, it is preferable if the remote control unit is connected to the display unit by a single bus cable including a plurality of signal lines.

According to a particularly preferred embodiment of the present disclosure, further sensor lines are each connected directly to the electronic control unit. In this instance, the number of lines is also reduced. In particular, the following may be provided: a sensor of the side stand (safety deactivation when the stand is folded down), a sensor of the gearing, acceleration sensors (3D gyro and accelerometer), a sensor for detecting a bicycle folding in folding bikes, pressure sensors and temperature sensors.

The communication is preferably carried out with the aid of CAN bus methods, particularly preferably by CAN open methods. A CAN translator is provided for adaptation requirements.

In a particularly preferred embodiment of the present disclosure, the remote control unit for the display unit is situated in the region of a handlebar grip remote from the display unit and has assistance selection keys for the selection of the assistance level and has at least one input device for the menu navigation and selection of menu items shown on the display unit.

It has proven to be particularly advantageous if input device and assistance selection keys are situated along a common line. The common line can be multidimensionally curved in an ergonomically arcuate manner.

The input device and the keys are preferably situated one below the other in such a manner that they are ergonomically operable by the thumb of the rider. A safety-critical repositioning of the hands of the rider is not required for operating the assistance selection keys and the input device.

In a particularly preferred embodiment of the present disclosure, the input device is configured as a joystick. As a result, the menu navigation and selection of menu items shown on the display unit can be carried out intuitively and ergonomically, preferably by the thumb of the rider.

The joystick is preferably movable in all four directions (upward and downward, left and right), the selection/selection of menu items being carried out with the aid of pressure onto the joystick (pressure function). The menu navigation and selection of the menu items is carried out with the multifunctional joystick, so that no further operating elements are required. For this reason, the remote control unit is configured in an extremely compact and aesthetically pleasing manner. The joystick may have a backlit symbol, in particular a rectangle having rounded corners.

It has proven to be particularly advantageous if the assistance selection keys are situated in an inclined manner to one another. In this instance, the selection of the assistance level may be carried out by the thumb of the rider. The assistance selection keys preferably form a concave section. The thumb can rest between the keys situated one above the other so that the operation is carried out intuitively, the assistance selection key for increasing the assistance level preferably being situated in the front in the direction of travel and the assistance selection key for reducing the assistance level being situated in the rear in the direction of travel.

Furthermore, it is preferable that the assistance selection keys are inclined toward the hand of the rider. The operation can be carried out ergonomically preferably by the thumb of the rider.

The assistance selection key for increasing the assistance level is preferably marked with a plus symbol and the assistance selection key for reducing the assistance level is marked with a minus symbol. The symbols are preferably backlit and, for this reason, recognizable even in conditions of poor visibility.

Regarding manufacturing technology and operation, it has proven advantageous that the assistance selection keys have a free actuation section facing the hand of the rider and an elastically mounted end section.

According to a preferred embodiment of the present disclosure, a light switch is laterally offset in the region between the assistance selection keys. Preferably, the light switch is situated in the direction remote from the hand of the rider next to the assistance selection keys. It has proven to be particularly ergonomic if the light switch is situated laterally offset in the middle between the assistance selection keys.

Preferably, the light switch has three functions, each of which are activated sequentially by pressing a key: keep key pressed (>2 s), light on/off; push key, dipped beam, push key for the second time, light lights up. As a result, advantageously there is one button for light on/low/high/off. The light switch may have a backlit light symbol.

In electric bicycles having an electronic gearing of the geared motor, the remote control unit preferably has along a pivot axis a centrally mounted rocker switch for gear selection. According to the present disclosure, it is advantageous if the rocker switch has two actuation surfaces, a first actuation surface being situated on a side facing the hand of the rider and a second actuation surface being situated on a side facing away from the hand of the rider. Preferably, input device, assistance selection keys and rocker switch are situated along a common line. The keys are preferably situated one below the other in such a manner that they are ergonomically operable by the thumb of the rider. A safety-critical repositioning of the hands of the rider is not required for operating the assistance selection keys and the rocker switch.

In a preferred embodiment of the remote control unit, the remote control unit has an upper part and a modularly exchangeable lower part, the rocker switch being assigned to the lower part. For this reason, the remote control unit is modularly adaptable to bicycles with and without an electric geared motor. For this purpose, a lower part designed as a clamp half is mounted with or without a rocker switch. The upper part and lower part are preferably electrically connected with the aid of a flexible band.

The rocker switch preferably has an approximately centrally situated automatic key. The automatic key preferably does not rock and activates the automatic gear selection.

When viewed in the direction of the handlebar grip axis, the input device, assistance selection keys and rocker switch preferably extend along a convexly arcuate common line, the curvature curve of which is ergonomically adapted to the movement range of the thumb of the rider.

Preferably, the remote control unit has a vibration motor. For example, having reached the highest assistance level can be signaled with the aid of a short vibration. Furthermore, a switching operation can be proposed with the aid of a short vibration. Preferably, a gear proposal is made on the display unit, for example, an upward arrow on the display suggesting to shift up, the vibration alerting the rider that the display unit is displaying new information.

The present disclosure can be used universally in all types of bicycles, especially in mountain bikes (both in hardtail or full-suspension design), but also can be implemented in other bicycles, for example, road bike frames and, thus, ultimately resulting in a touring, city or cross-bike or other modern types of bicycles. Owing to its compact, attractive design, it enables the construction of bikes which largely combine the advantages of a classic bicycle and an electric bicycle.

BRIEF DESCRIPTION OF THE DRAWINGS

A preferred embodiment of the present disclosure is subsequently explained in greater detail in reference to the appended drawings. For this purpose, in detail:

FIG. 4 shows a detailed view of the drive region; and

FIG. 5 shows a detailed view of the electronic control unit.

DETAILED DESCRIPTION

Figure 1:
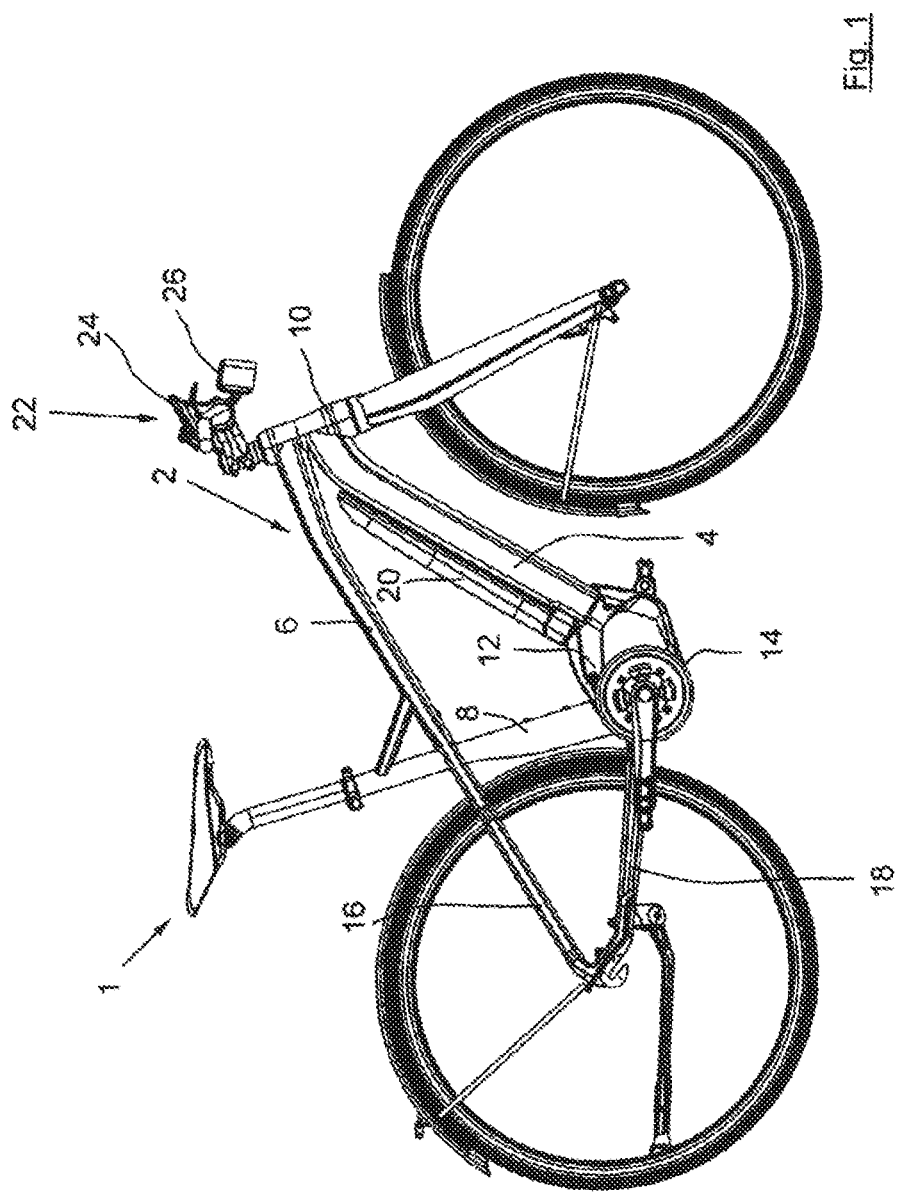
FIG. 1 shows a side view of the electric bicycle according to the present disclosure.

FIG. 1 shows a side view of an electric bicycle 1 according to the present disclosure, having an exemplary bicycle frame 2 configured as a diamond frame, having a down tube 4, a top tube 6, a seat tube 8, a head tube 10, a drive carrier 12 for a drive unit 14 and seat struts 16 and lower struts 18, and a battery unit 20 situated at down tube 4.

Figure 2:
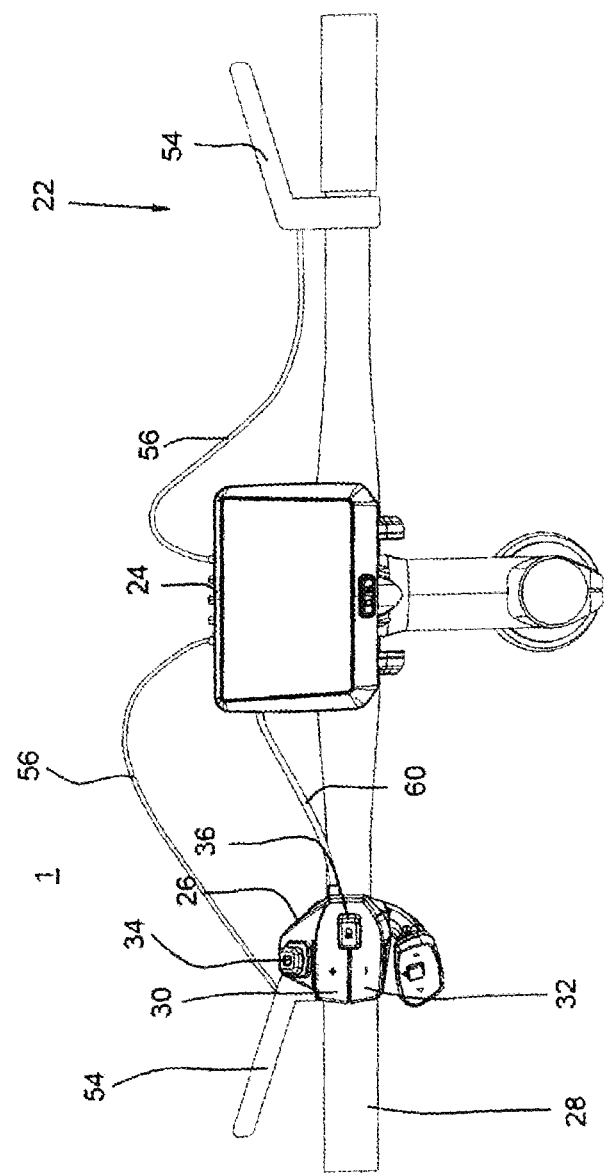
FIG. 2 shows a detailed view of the electric bicycle from FIG. 1 in the region of the handlebar.

As in particular can be concluded from FIG. 2, which shows a detailed representation of electric bicycle 1 from FIG. 1 in the region of handlebar 22, a display unit 24 situated centrally on handlebar 22 and a remote control unit 26 are provided. Remote control unit 26 is situated in the region of a left handlebar lever 28 remote from display unit 24 and has two assistance selection keys 30, 32 for the selection of the motor assistance level, and an input device designed as a joystick 34 for menu navigation and selection of menu items displayed on display unit 24. Furthermore, remote control unit 26 has a light switch 36.

Figure 3:
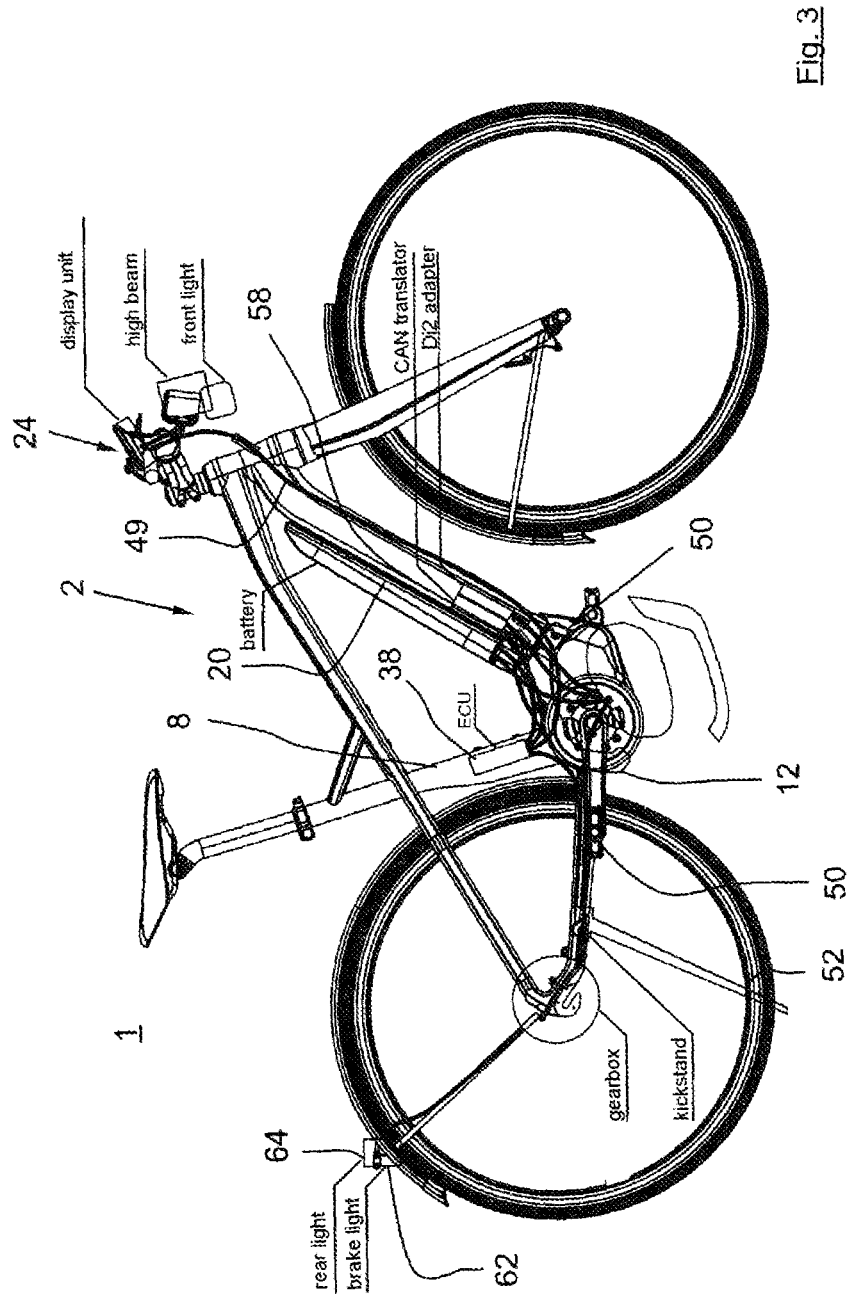
FIG. 3 show a schematic side view of the electric bicycle from FIG. 1.

As shown in FIG. 3, which shows a schematic side view of electric bicycle 1 of FIG. 1, electric bicycle 1 has an electronic control unit 38 (ECU). Electronic control unit 38 is situated in seat tube 8 of bicycle frame 2. In so doing, a highly integrated interaction between bicycle frame 2 and the installation components is achieved. The design of battery unit 20 is not limited and more space for the battery cells and, thus, a high operating distance is available. Owing to the thermal decoupling of battery unit and electronic control unit, a high efficiency is achieved. Special battery housings having fastening options for control unit 38 are not required.

Electronic control unit 38 is installed in the lower section of seat tube 8 on drive carrier 12. As a result, the electrical line length is reduced to a minimum. As a result, electric bicycle 1 has an optimized frame cross-section having constructively and aesthetically best features for optimized space requirements.

In this instance, electronic control unit 38 is attached to frame-side drive carrier 12, as shown in particular in the detailed view of the drive region shown in FIG. 4. Above electronic control unit 38, a bottle holder bush 39 is disposed as a stop for the seat post (not shown). As a result, damage to electronic control unit 38 by a long seat post is prevented.

The attachment of control unit 38 at drive carrier 12 is carried out according to FIG. 5, which shows a detailed representation of electronic control unit 38, via L-shaped fastening bracket 42 attached with the aid of screws 40 to the rectangular housing of control unit 38. The attachment of fastening bracket 42 on drive carrier 12 is also carried out with the aid of a screw 44.

Electronic control unit 38 is provided with line connectors 48 only at an end section 46 facing drive unit 14, so that the construction is simplified and the line lengths are minimal. All lines are guided out at the bottom of the frame.

According to FIG. 3, electrical line 49 of display unit 24 is connected to electronic control unit 38. In this instance, it is advantageous that only one line is required.

Furthermore, sensor lines 50 of kickstand 52 (safety deactivation when the stand is folded down), of the geared motor, etc., are each directly connected to electronic control unit 38. In this instance, the number of lines is reduced.

Sensor lines 56 assigned to brake levers 54 are, according to FIG. 2, connected directly to display unit 24, so that only one line 49 between display unit 24 and control unit 38 is required.

ECU communication is carried out with the aid of CAN open methods. A CAN translator is provided for adaptation requirements. A signal line 60 of remote control unit 26 is connected to display unit 24 (see FIG. 2). Accordingly, it is preferable if the remote control unit is connected to the display unit by a single bus cable including a plurality of signal lines. When operating the break, a break light 62 of a tail lamp 64 is activated.

The present disclosure can be used universally in all types of bicycles, especially in mountain bikes (both in hardtail or full-suspension design), but also can be implemented in other bicycles, for example, road bike frames and, thus, ultimately resulting in a touring, city or cross-bike or other modern types of bicycles. Because of its compact, attractive design, it enables the construction of bikes which largely combine the advantages of a classic bicycle and an electric bicycle.

The embodiment of the present disclosure is not limited to the examples shown in the figures and as explained above, but is possible in a plurality of modifications by those skilled in the art.

Disclosed is an electric bicycle 1 having a control unit 38, a drive unit 14, a battery unit 20, a display unit 24 and a remote control unit 26 for display unit 24, remote control unit 26 being situated in the region of a handlebar 28 remote from display unit 24. According to the present disclosure, electronic control unit 38 is situated in seat tube 8 of bicycle frame 2.

LIST OF REFERENCE CHARACTERS 1 electric bicycle
2 bicycle frame
4 down tube
6 top tube
8 seat tube
10 head tube
12 drive carrier
14 drive unit
16 seat strut
18 lower strut
20 battery unit
22 handlebar
24 display unit
26 remote control unit
28 left handlebar grip
30 assistance selection key
32 assistance selection key
34 joystick
36 light switch
38 electronic control unit
39 bottle holder bush
40 screw
42 fastening bracket
44 screw
46 end section
48 line connector
49 electric line
50 sensor line
52 kickstand
54 brake levers
56 sensor line
58 CAN translator
60 signal lines
62 brake light
64 tail lamp

The invention claimed is:

1. An electric bicycle comprising a bicycle frame, an electronic control unit, a drive unit configured for providing a level of motor assistance, a battery unit, a display unit and a remote control unit for the display unit, wherein the remote control unit is situated in a region of a handlebar grip remote from the display unit, wherein the electronic control unit is situated in a seat tube of the bicycle frame, wherein the electronic control unit is situated in a lower region of the seat tube adjacent to the drive unit and attached directly at a frame-side drive carrier of the bicycle frame via a fastening bracket.

2. The electric bicycle of claim 1, wherein the electronic control unit comprises line connectors only at an end section facing the drive unit.

3. The electric bicycle of claim 1, wherein above the electronic control unit a stop is disposed for the seat post.

4. The electric bicycle of claim 1, wherein at least one signal line of the remote control unit is connected to the display unit and at least one electric line of the display unit is connected to the electronic control unit.

5. The electric bicycle of claim 1, comprising brake sensor lines directly connected to the display unit.

6. The electric bicycle of claim 5, wherein the brake sensor lines respectively are directly connected to the electronic control unit.

7. The electric bicycle of claim 1, wherein the remote control unit is connected by a single bus cable to the display unit.

8. The electric bicycle of claim 1, configured for communication to be carried out with a CAN bus method or a CAN open method.

9. The electric bicycle of claim 3, wherein the stop is a fastening element of a bottle holder.

\* \* \* \* \*